Aug. 9, 1938.   A. J. CORDREY   2,125,888
DRY ICE REFRIGERATING APPARATUS
Filed June 29, 1936   2 Sheets-Sheet 1
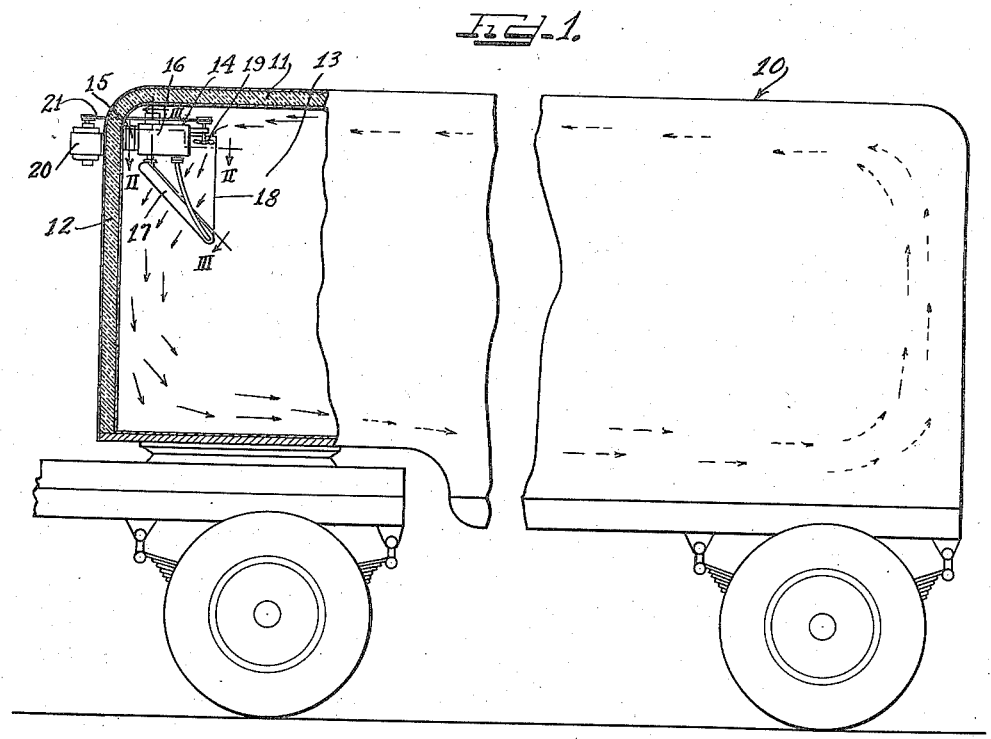
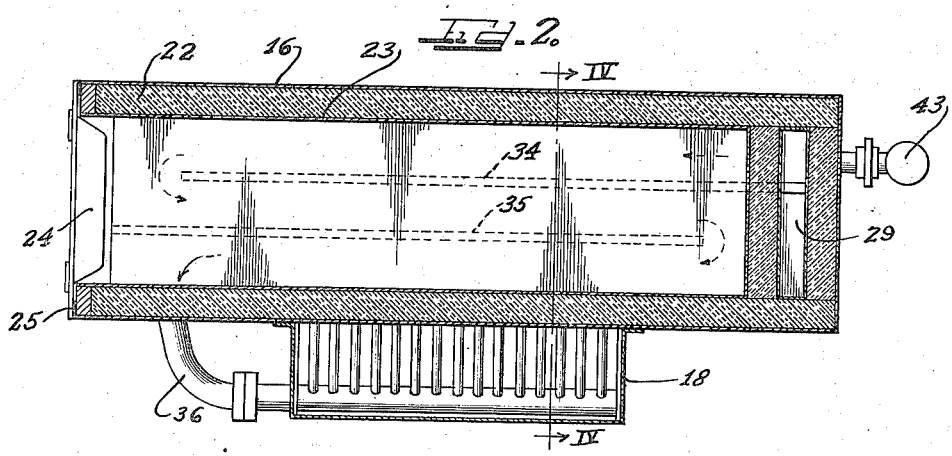
Inventor
ALMON J. CORDREY.
by Charles H. Hills Attys.

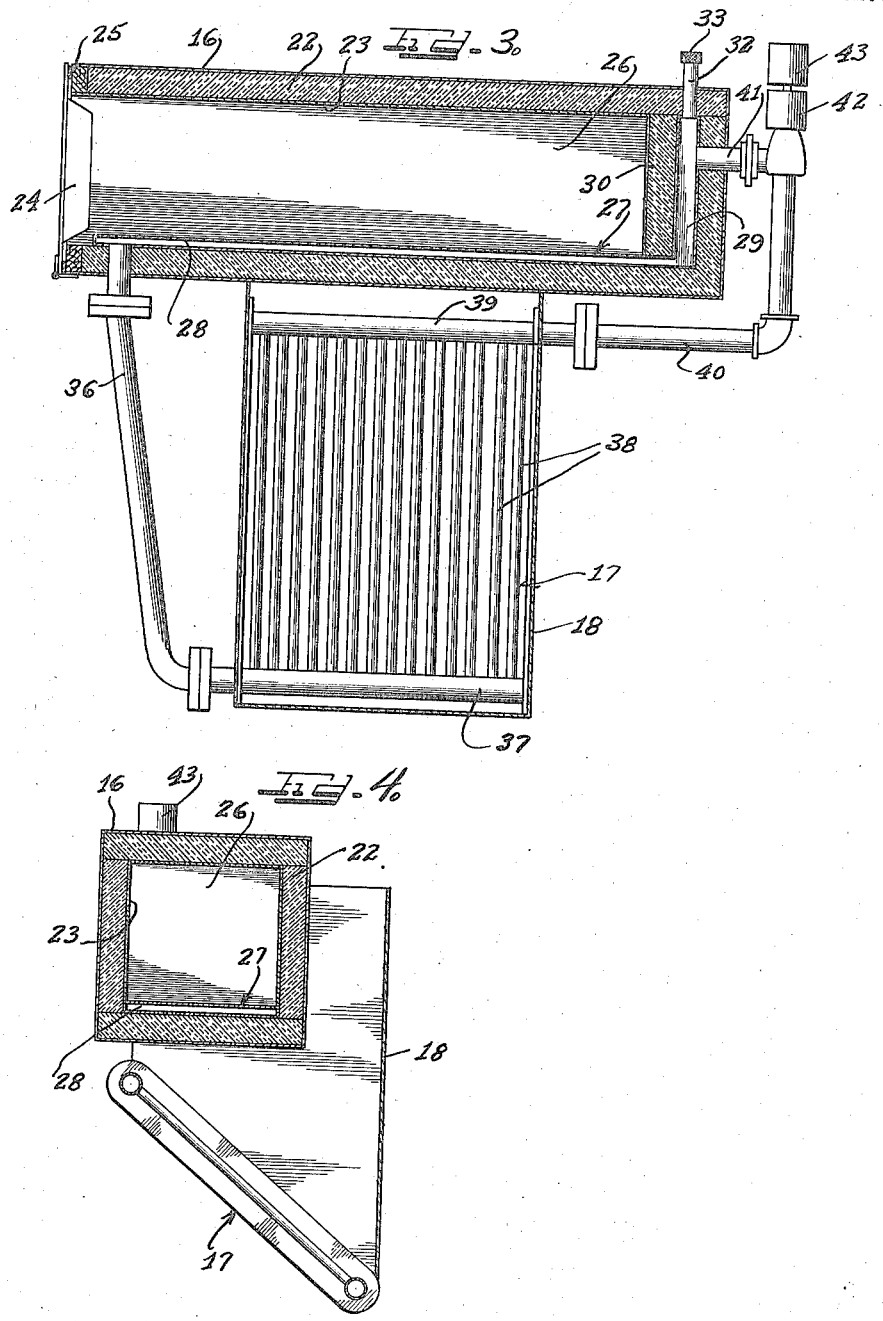

Patented Aug. 9, 1938

2,125,888

UNITED STATES PATENT OFFICE 2,125,888

DRY ICE REFRIGERATING APPARATUS

Almon J. Cordrey, Chicago, Ill., assignor to The Liquid Carbonic Corporation, Chicago, Ill., a corporation of Delaware Application June 29, 1936, Serial No. 87,881

5 Claims. (Cl. 62—91.5)

This invention relates to refrigeration apparatus adapted to cool the storage space of a truck or trailer with the aid of a cooling agent such as dry ice.

More specifically this invention relates to a compact refrigeration apparatus adapted to be mounted within the interior of a truck or trailer body and includes a receptacle for dry ice or similar cooling agent and a liquid circulating system in thermal relation to the cooling agent.

In the transporting of heat perishable goods such as fruit, vegetables and other food it has heretofore been considered necessary to provide trucks and trailers with large storage compartments for water ice to refrigerate the truck or trailer. Mechanically refrigerated trucks are not always desirable because of the high initial cost of the refrigerating apparatus and the drain of power from the truck engine necessary to operate the apparatus.

According to this invention transport trucks, trailers and other vehicles can be equipped at low cost with a refrigerating apparatus that is operable without drain of power from the vehicle engine and without requiring the use of a large auxiliary engine.

The invention also dispenses with the loss in storage space and the added weight necessary when cooling the vehicle with water ice.

The apparatus of this invention includes a dry ice container mounted in the interior of the truck preferably near the top at the front end thereof. A heat exchanger is mounted below the dry ice container and a liquid having a low freezing point, such as alcohol or the like, is circulated in thermal contact with the dry ice in the container where it is cooled. The cooled liquid is then flowed through the heat exchanger and the air within the vehicle is circulated around the heat exchanger to be cooled by contact therewith. The liquid from the heat exchanger is then recirculated back through the dry ice container. The flow of the liquid from the dry ice container through the heat exchanger and back to the container can be readily effected by a thermo-siphon arrangement and the amount of circulation can be regulated by a thermostatic valve. The valve can be set to maintain any desired temperature in the heat exchanger.

The entire apparatus of this invention is compact, simple in operation and can be manufactured at a low initial cost.

It is then an object of this invention to provide a compact, inexpensive refrigeration apparatus for cooling the interiors of storage spaces such as the storage spaces of trucks and trailers.

A further object of this invention is to provide refrigeration apparatus adapted to use dry ice as the cooling agent and including a thermo-siphon circulation system.

Another object of this invention is to provide an apparatus for cooling the storage spaces of trucks and trailers that is adapted to use dry ice as the cooling agent.

Another object of this invention is to provide an apparatus for cooling storage spaces, such as trucks, trailers, cold storage rooms, that is adapted to use dry ice as the cooling agent, and thermostatically control the temperature of such storage spaces.

A further object of this invention is to provide a refrigerating apparatus including an insulated dry ice container and a thermo-siphon liquid circulation system in compact relationship for mounting within the interior of a space to be cooled.

Other and further objects of this invention will become apparent from the following detailed description of the annexed sheets of drawings which disclose a preferred embodiment of the invention.

On the drawings:

Figure 1 is a broken side elevational view of a trailer with a part cut away in cross-section to illustrate a refrigeration apparatus of this invention mounted within the trailer.

Figure 2 is an enlarged horizontal cross-sectional view, with parts in elevation, taken substantially along the line II—II of Figure 1.

Figure 3 is a cross-sectional view, with parts in elevation, taken substantially along the line III—III of Figure 1, and Figure 4 is a cross-sectional view taken substantially along the line IV—IV of Figure 2.

As shown on the drawings:

In Figure 1, the reference numeral 10 indicates a truck trailer of the usual type having an insulated roof 11 and walls 12 defining a storage space 13. The space 13 is used for packing heat perishable material such as foodstuffs and the like. According to this invention a refrigeration apparatus indicated generally by the reference numeral 14 is suspended from a bracket 15 or other supporting means on a front wall 12 of the trailer 10 near the roof 11.

The refrigeration apparatus 14 includes an insulated container 16 for dry ice, a radiator or heat exchanger 17 suspended below the container 16, an air deflecting shield 18 disposed around the heat exchanger 17 for directing air in the space 13 around the heat exchanger. If desired a fan 19 can be rotatably supported as shown in back of the shield 18 for propelling the air around the heat exchanger 17. The fan 19 can be rotated by a motor 20 located outside of the storage space 13 as shown and operatively connected to the fan through a belt 21 extending through the front wall of the trailer. Obviously, any type of prime mover can be used to propel the fan and the prime mover, if desired, can be mounted within the storage space 13. Since the heat exchanger is equipped with a warm air baffle or shield, thus inducing a natural air circulation through the heat exchanger, it may be used without a fan, or the fan used may be of small capacity, requiring for operation say only 5 to 10 amperes per hour from a storage battery. Such a fan will accelerate the natural circulation of air by convection. This type of fan and motor can be located inside the cold storage space without materially increasing the total heat load which is to be handled.

As best shown in Figures 2, 3 and 4, the container 16 is lined with insulation 22 such as cork or the like and an inside lining sheet 23 is preferably used to protect the insulation. The sheet 23 extends around three sides of the container and may be composed of metal or wood.

One end of the container 16 is provided with a door 24 giving access to the interior of the container. The door 24 when closed preferably seals the interior of the container and for sealing purposes a rubber gasket such as 25 may be disposed peripherally between the door and the end of the container.

The container 16 and door 24 thereby define a closed storage space 26 adapted to receive a cooling medium therein such as pieces or slabs of dry ice.

A fluid-tight tank or closed container 27 is mounted within the container 16 and includes a horizontal portion 28 extending across the entire bottom of the space 26 within the container 16 and a vertical portion 29 extending along the closed end of the container 16. An insulated partition wall 30 preferably separates the vertical portion 29 of the tank 27 from the storage space 26 of the container 16.

The top of the vertical portion 29 of the tank 27 may have a pipe or tube 32 extending therein and upward therefrom through the top wall of the container 16 to permit a filling of the tank 27 with a liquid having a low freezing point, such as, for example, alcohol or the like. The filling tube 32 is closed with a cap 33 except during the filling operation.

Liquid within the tank 27 must flow from the portion 29 thereof into the portion 28 around baffles 34 and 35 (Figure 2). Thus the liquid has a sinuous path within the portion 28 of the tank and since the space 26 of the container 16 is filled with a cooling medium such as dry ice the liquid is cooled by thermal contact through the walls of the tank.

The cooled liquid in the portion 28 of the tank 27 flows downward through a pipe 36 into a header 37 of the heat exchanger 17. Liquid from the header 37 flows up through the tubes 38 of the heat exchanger where it absorbs heat from the air propelled around the tubes 38. The warmed liquid is then collected in a top header 39 of the heat exchanger and flows through piping 40 and 41 back into the portion 29 of the tank 27. The inlet of the pipe 41 into the portion 29 of the tank 27 is considerably above the portion 28 of the tank so that the liquid will flow by gravity into the portion 28 and will not back up through the piping 41 and 40. This arrangement provides for a thermo-siphoning or thermal convection circulation of cooled and warmed liquid. The cooled liquid flows downward by gravity and upward through the heat exchanger 17 because of the hydrostatic head of liquid thereabove. The warmed liquid then flows upward by convection and hydrostatic head pressure into the portion 29 of the tank.

The amount of circulation of liquid can be controlled by a thermostatic valve 42 provided in the piping 40. This valve 42 can be set by an adjusting means 43 to open at any desired temperature and to close at a desired temperature so that the circulation of the liquid will be maintained at a rate to keep the heat exchanger 17 at a constant temperature.

As shown in Figure 4, the baffle 18 extends around the heat exchanger 17 and around a portion of the container 16. This baffle 18 merely serves as a shield for directing air propelled by the fan 19 around the tubes 38 of the heat exchanger 17. The circulation of air within the storage space 13 of the trailer 10 is thus maintained, as indicated by the arrows shown therein.

The baffles 34 and 35 within the portion 28 of the tank 27 provide a prolonged contact of the liquid with the cooling agent in the space 26 of the container 16. By guiding this liquid through spaces of less cross-sectional area, a higher rate of flow of liquid in contact with the heat conduction surface is obtained, and heat transfer from the dry ice to the liquid is thus accelerated. The tank 27 is, of course, composed of a metal that is a good conductor of heat.

From the above description, it should be understood that this invention provides a simple, compact refrigerating apparatus for mounting within the storage space of a truck, trailer or the like vehicle, and includes a dry ice storage compartment and a heat exchanger. A liquid is circulated through the heat exchanger for absorbing heat from the air within the space and the heated liquid is then cooled by dry ice in the container and recirculated to the heat exchanger. The compartment holding the refrigerant, dry ice, may be built into the roof of the truck or storage space, and the heat exchange surface be located just under the roof of the compartment, thus taking up less space on the inside of the storage compartment.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. Dry ice refrigeration apparatus adapted to be mounted in the storage space of a truck or the like comprising an elongated insulated housing defining a storage space for dry ice, a closed tank in said housing having a horizontal portion disposed along the bottom thereof and a vertical portion disposed along an end wall thereof, means for filling said tank with a liquid having a low freezing point, said tank having an outlet opening for liquid in the horizontal portion thereof and an inlet opening for liquid in the vertical portion thereof near the top of said vertical portion, a heat exchanger below said housing having inlet and outlet headers connected through heat-absorbing tubes, piping connecting the outlet opening of said tank with the inlet header of the heat exchanger, additional piping connecting the outlet header of the heat exchanger with the inlet opening of said tank, and a thermostatic valve in said additional piping for controlling the flow of liquid through said piping whereby warm liquid is cooled by the cooling agent in the storage space of said housing, circulates through the heat exchanger for cooling the heat exchanger and surrounding air and is then recirculated back to the tank.

2. Dry ice refrigerating apparatus adapted to be mounted within a storage space for cooling the air in said space comprising, in compact assembled relation, an insulated housing for dry ice, a closed tank in said housing having a horizontal portion disposed along the bottom thereof and a vertical portion disposed along one end thereof, means in said vertical portion for filling said tank with a liquid, said horizontal portion of the tank having a discharge outlet, a heat exchanger below said housing having an inlet header and an upper outlet header connected by heat-absorbing tubes, said vertical portion of said tank having an inlet opening at a higher level than the discharge opening in the horizontal portion, means effecting liquid communication between the discharge header of the heat exchanger and the inlet of the tank, and between the discharge opening of the tank and inlet header of the heat exchanger, a shield disposed in front of said heat exchanger for directing air from said space therearound, and means for propelling said air whereby liquid in said tank is cooled by dry ice in said housing, circulates through said heat exchanger for cooling the air directed around the heat exchanger and recirculates back to the tank in the housing.

3. Dry ice refrigeration apparatus adapted to be mounted within the storage space of a truck or the like to cool the air in said space comprising, in compact assembled relation, a housing for dry ice, a tank in said housing having a horizontal portion along the bottom of the housing and a vertical portion along one end of the housing, said tank having an outlet opening in horizontal portion and an inlet opening in the vertical portion thereof, a heat exchanger below said housing fluid communication with said tank, elongated baffles in said tank for directing liquid in the horizontal portion in a sinuous path between said inlet opening and said outlet opening whereby said liquid is circulated through said heat exchanger to cool the heat exchanger, flowed upwardly by convection into the vertical portion of the tank, circulated around the baffles in the horizontal portion of the tank where it is cooled by dry ice in said housing and recirculated by gravity and hydrostatic pressure back to the heat exchanger.

4. In combination with an enclosure having walls and a ceiling, a refrigeration apparatus for cooling said enclosure comprising an insulated housing for a cooling agent mounted along a wall of the enclosure near the ceiling of the enclosure, a liquid container in said housing having inlet and outlet openings thereto with the inlet opening above the outlet opening, a heat exchanger suspended below the housing, piping connecting the outlet opening of the liquid container with the bottom of the heat exchanger, additional piping connecting the inlet opening of the liquid container with the top of the heat exchanger, a shield disposed in spaced relation around part of said housing and said heat exchanger below the ceiling of the enclosure and defining with the adjacent wall of the enclosure a passageway for air, and a fan for propelling air from the top of the enclosure downwardly through said passageway to flow around the heat exchanger and be cooled by contact therewith, whereby liquid from the container in the heat exchanger is warmed and flows upwardly back to the liquid container to be cooled therein by the cooling agent in the housing and recirculated back to the heat exchanger.

5. In combination with a vehicle body having a roof and side walls defining a storage space, refrigeration apparatus mounted in said vehicle along a wall thereof and near the roof of the vehicle comprising a housing for a cooling agent, means defining a passageway for liquid in said housing, said passageway having inlet and outlet openings thereto, a heat exchanger suspended below the housing having inlet and outlet openings, piping connecting the inlet opening of the heat exchanger with the outlet opening of the passageway, additional piping connecting the outlet opening of the heat exchanger with the inlet opening of the passageway, a shield disposed in spaced relation around part of said heat exchanger, said shield being mounted in said storage space beneath the roof of the vehicle and defining with the adjoining wall of the vehicle an air passageway, and a fan mounted behind said shield to flow air through said passageway from along the roof of the vehicle downwardly around the heat exchanger for contact therewith whereby liquid from the passageway in the housing is warmed as it flows through the heat exchanger and flows back to the passageway in the housing to be cooled by the cooling agent therein for recirculation back to the heat exchanger.

ALMON J. CORDREY.